United States Patent [19]
Soeder

[11] Patent Number: 5,644,762
[45] Date of Patent: Jul. 1, 1997

[54] METHOD AND APPARATUS FOR RECORDING AND READING DATE DATA HAVING COEXISTING FORMATS

[75] Inventor: Thomas B. Soeder, West Friendship, Md.

[73] Assignee: Resolve 2000, Inc., Columbia, Md.

[21] Appl. No.: 645,822

[22] Filed: May 14, 1996

[51] Int. Cl.$^6$ .................................................. G06F 17/30
[52] U.S. Cl. ............................................. 395/606; 395/611
[58] Field of Search ...................................... 395/600, 610

[56] References Cited

U.S. PATENT DOCUMENTS

| | | | |
|---|---|---|---|
| 3,996,450 | 12/1976 | Kerkhoff | 235/380 |
| 4,044,347 | 8/1977 | Van Voorhis . | |
| 4,573,127 | 2/1986 | Korff | 364/493 |
| 4,654,633 | 3/1987 | Tonomura . | |
| 4,752,765 | 6/1988 | Larson . | |
| 4,947,163 | 8/1990 | Henderson et al. | 340/825.31 |
| 5,119,465 | 6/1992 | Jack et al. | 395/500 |
| 5,293,355 | 3/1994 | Widen et al. | 368/19 |
| 5,319,779 | 6/1994 | Chang et al. | 395/600 |
| 5,444,820 | 8/1995 | Tzes et al. | 395/22 |

FOREIGN PATENT DOCUMENTS 5-327518  12/1993  Japan .

OTHER PUBLICATIONS

Hart et al, "A Scaleable, Automated Process for Year 2000 System Correction", PROC 18th International Conference on Software Engineering, 25–30 Mar. 1996, pp. 475–484. Mar. 30, 1996.

*Primary Examiner*—Wayne Amsbury
*Attorney, Agent, or Firm*—Watson Cole Stevens Davis, P.L.L.C.

[57] ABSTRACT

Years past 1999 are stored as binary integers in fields previously reserved for representations of years as two decimal digits. The binary integers occupy ranges of values for the fields which are not used by an integer value corresponding to any possible combination of two decimal digits from 00 to 99. In this way, data using integer-encoded years and years represented by the last two decimal digits will be able to coexist for at least ten thousand years.

3 Claims, 2 Drawing Sheets

1

METHOD AND APPARATUS FOR RECORDING AND READING DATE DATA HAVING COEXISTING FORMATS

FIELD OF THE INVENTION

The invention is directed to a computer system with a capability of recording and reading dates both before and after Dec. 31, 1999, in existing computer-readable storage media (floppy disks, hard disks, RAM, ROM, tape media, or the like).

DESCRIPTION OF THE RELATED ART

In many computer applications, dates are represented in six-digit form by a concatenation of the last two digits of the year and digits representing the month and day. For example, in such applications, the date May 10, 1996, is represented as 960510 or 051096 or Julian day plus 96. Each of the six digits is stored in eight bits in an appropriate storage medium in accordance with a known computer character set. One such character set, used by both IBM-compatible PC's and Macintoshes and known as ASCII (American Standard Code for Information Interchange), maps digits 0 through 9 to bytes 0011 0000 through 0011 1001. Another such character set, used by IBM mainframes and known as EBCDIC, maps digits 0 through 9 to bytes 1111 0000 through 1111 1001. Thus, in ASCII, the date May 10, 1996, is stored as 0011 1001 0011 0110 0011 0000 0011 0101 0011 0001 0011 0000, so that the year 1996 is represented as 0011 1001 0011 0110, while in EBCDIC, the date May 10, 1996 is stored as 1111 1001 1111 0110 1111 0000 1111 0101 1111 0001 1111 0000, so that the year 1996 is represented as 1111 1001 1111 0110. If the date is represented in the format 051096, the first 16 bits will be moved to be the last 16 bits. Eight-bit character sets have traditionally been favored because they can represent every character on a standard keyboard and still have room left over for control codes, line-draw characters, or accented letters.

While the representation of dates described above works for all dates from Jan. 1, 1900, through Dec. 31, 1999, it cannot store subsequent dates without confusion, inasmuch as there is no provision for distinguishing, for example, May 10, 2096, from May 10, 1996. While one solution would be to extend the date fields in databases from six bytes to eight, such a solution would require a burdensome process of rewriting much information already stored.

SUMMARY OF THE INVENTION

An object of the invention is to record dates beginning with Jan. 1, 2000, in computer-readable storage media without confusion and without the need to rewrite existing information.

The invention is based on the following realization. In the prior-art scheme described above, whichever character set is used for mapping digits 0 through 9, the range of two-byte sequences needed to represent all sets of two digits from 00 through 99 is a small subset of all possible two-byte sequences; this range has as its bounds the two-byte sequences needed to represent 00 and 99. For example, in ASCII, the range is 0011 0000 0011 0000 through 0011 1001 0011 1001 inclusive. Similarly, in EBCDIC, the range is 1111 0000 1111 0000 through 1111 1001 1111 1001 inclusive. Thus, even if both ASCII and EBCDIC are in use, all two-byte sequences falling outside these ranges are unused.

The significance of this realization becomes even more striking when the integer values of the two-byte sequences are expressed in base 10. A sequence of two eight-bit bytes can represent any value from zero through $2^{16}-1=65,535$. The integer values of ASCII 00 and ASCII 99 are 12,336 and 14,649, respectively. The integer values of EBCDIC 00 and EBCDIC 99 are 61,680 and 63,993, respectively. That is, the ranges 0–12,335, 14,650–61,679 and 63,994–65,535 are unused.

The invention achieves the above-described object by using at least one of these unused ranges to integrate at least two formats for encoding the year data in the following manner. Existing date data are unchanged. For new date data i.e., after Dec. 31, 1999, the integer value of the year number is represented in binary format, and the binary representation is written in the two bytes already allocated for the year. At the very least, using the range 0–12,335, all years from one through 12,335 can be represented in this manner without conflict with existing date data. As an example, the year 2096 is represented as 0000 1000 0011 0000.

In reading out a date, first, the integer value of the two bytes of data written into the year value is determined. If this integer value is below 12,336, the integer value itself is taken to be the number of the year. If this integer value is in the range from 12,336 through 14,649 inclusive, the year is determined to have been written in ASCII format and is treated accordingly. If this integer value is in the range from 61,680 through 63,993 inclusive, the year is determined to have been written in EBCDIC and is treated accordingly.

Of course, the ranges 14,650–61,679 and 63,994–65,535 could be similarly used.

BRIEF DESCRIPTION OF THE DRAWING

The invention will now be disclosed in detail with reference to the drawings, in which.

DETAILED DESCRIPTION OF THE PREFERRED EMBODIMENT

Figure 1:
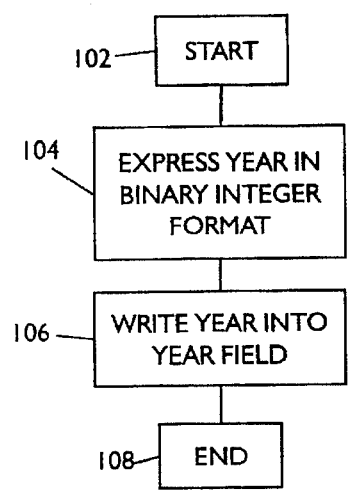
FIG. 1 is a flow chart showing the operation of writing a year in accordance with the invention.

FIG. 1 shows the operation of writing a year in accordance with the preferred embodiment of the invention. It is contemplated that this operation will be used on and after Jan. 1, 2000, although it could be implemented at any time.

The operation starts at step 102. In step 104, the year is expressed in binary integer format. In step 106, the year is written into the year field. The operation ends at step 106.

Figure 2:
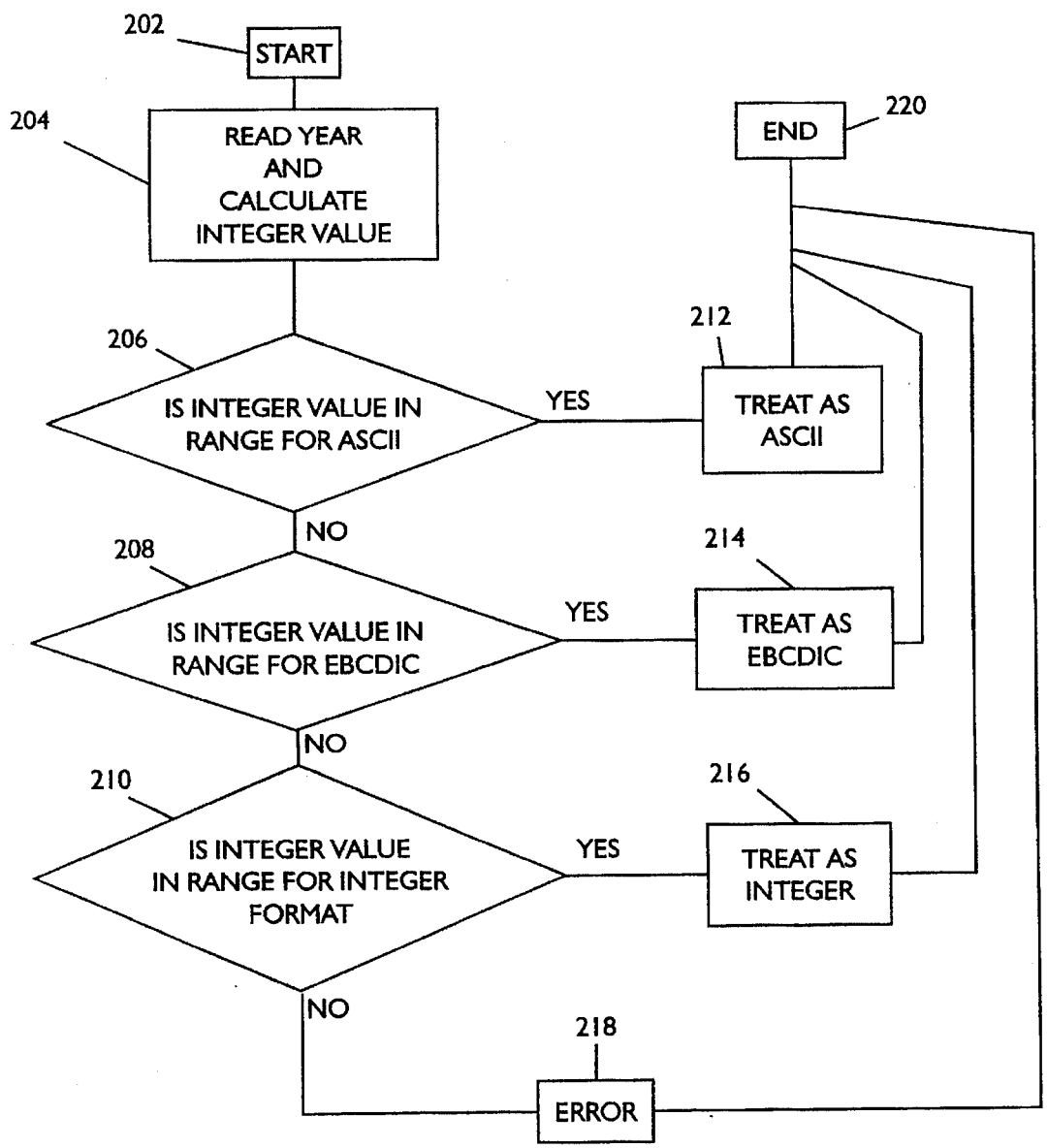
FIG. 2 is a flow chart showing the operation of reading a year in accordance with the invention.

FIG. 2 shows the operation of reading a year in accordance with the preferred embodiment of the invention, and the integer value is calculated. The integer value is compared with the ranges for ASCII (step 206), EBCDIC (step 208) and the integer format described above for the invention (step 210) and is treated accordingly (steps 212–216). If the integer value falls outside any of these ranges, an error message is given (step 218). The operation then ends (step 220).

Figure 3:
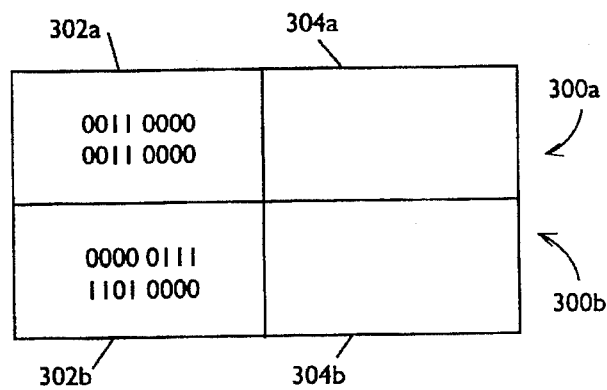
FIG. 3 shows sample data records.

FIG. 3 shows a data structure for use with the two operations described above. Data record 300a includes year field or datum 302a and other fields 304a; similarly, data record 300b includes year field or datum 302b and other fields 304b. The other fields can contain any information desired to be associated with the year. Year field 302a contains the bits 0011 0000 0011 0000. These bits correspond to ASCII 00 and are interpreted as indicating the year 1900. Year field 302b contains the bits 0000 0111 1101 0000. These bits lie outside the ranges for both ASCII and EBCDIC, but instead have an integer value of 2000 and are interpreted as indicating the year 2000.

Figure 4:
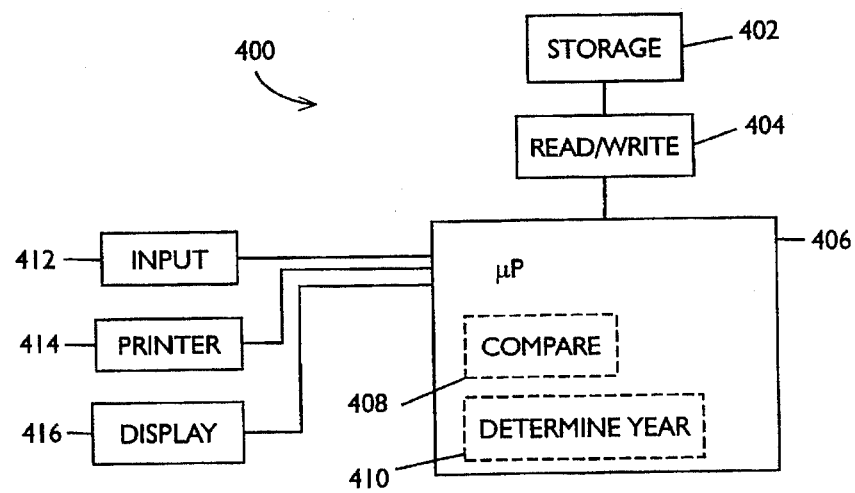
FIG. 4 shows a computing device in accordance with the invention.

FIG. 4 shows a computing device for implementing the invention. Computing device 400 includes storage 402 for storing the data records of FIG. 3. Read/write device 404 reads from and writes to the storage under control of a processor such as microprocessor 406, thus allowing data exchange between the storage and the microprocessor. The microprocessor or other processor has logic circuitry with comparing capabilities 408 and year determining capabilities 410 for performing the operations of FIGS. 1 and 2. The computing device could be, e.g., an appropriately programmed IBM-compatible PC, Macintosh, mainframe or any sized computer (micro, mini, super and mainframe). The device can also include any or all of input 412 (e.g., a keyboard), printer 414 and display 416 as needed.

The following table shows the encoding of years according to the prior art and the preferred embodiment of the present invention:

encode year data. Also, the ranges that are unused in the preferred embodiment can be used to indicate years B.C. Alternatively, to indicate years B.C., the integer-encoded format can be encoded with a "minus" symbol by setting the highest-order bit to one, as is known in the art. Available negative integers include all negative integers not falling within the range described above for EBCDIC. Furthermore, the integer value used to indicate the year can include an offset, so that the year 2000 can be written, say, as 0000 0000 0000 0000, thus making it possible to write an additional two thousand years. Numbering systems other than binary, such as octal, can be used, although they decrease the practical range of years. Other variations exist for the invention, which should therefore be construed as limited only by the appended claims.

I claim:

1. A series of operational steps to be performed on or with the aid of a computer, said steps comprising:

(a) providing a computer-readable storage medium storing a plurality of year data, the plurality of year data comprising (i) a first year datum comprising two bytes which together have a composite binary integer value which represents at least four decimal digits of a first year and (ii) a second year datum comprising two bytes,

| Byte: | | | | | | | | Byte: | | | | | | | | | |
|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | hex Code | Integer value |
| 0 | 0 | 1 | 1 | 0 | 0 | 0 | 0 | 0 | 0 | 1 | 1 | 0 | 0 | 0 | 0 | ASCII 00 | 12,336 |
| 1 | 1 | 1 | 1 | 0 | 0 | 0 | 0 | 1 | 1 | 1 | 1 | 0 | 0 | 0 | 0 | EBCDIC 00 | 61,680 |
| 3 | 1 | 8 | 4 | 2 | 1 | 5 | 2 | 1 | 6 | 3 | 1 | 8 | 4 | 2 | 1 | Binary place values | |
| 2 | 6 | 1 | 0 | 0 | 0 | 1 | 5 | 2 | 4 | 2 | 6 | | | | | | |
| 7 | 3 | 9 | 9 | 4 | 2 | 2 | 6 | 8 | | | | | | | | | |
| 6 | 8 | 2 | 6 | 8 | 4 | | | | | | | | | | | | |
| 8 | 4 | | | | | | | | | | | | | | | | |
| 0 | 0 | 0 | 0 | 0 | 1 | 1 | 1 | 1 | 1 | 0 | 1 | 0 | 0 | 0 | 0 | Binary integer 2000 | |

The operations described above can be performed on any suitable computer with the appropriate programming or can be implemented in firmware, hard-wired configuration, microcode, or the like. The medium of FIG. 3 can be a floppy disk, a hard disk, ROM, RAM, a tape backup medium, or any other digital storage medium, as needed.

Examples of uses for the invention include the following. In a payment processing system at a bank, it is crucial to distinguish a payment due date in 2000 from one in 1900. Even commercial computer systems that do not process payments, such as airline reservation systems, frequently process date-sensitive information. Microcomputer applications, such as word processors and spreadsheets, often need to utilize information stored as date codes and thus need to be able to handle data representing all dates in which such applications will be used. This invention enables the date codes in the data base for the years 1900–1999 to remain the same, while storing dates codes for years 2000 and beyond in the binary integer format described above. The software for processing the dates codes need only be changed to include the capability of analyzing and processing date codes in both the integer-encoded format and the format involving years represented by the last two decimal digits.

While the preferred embodiment of the invention has been described, those skilled in the art who have reviewed this specification will readily appreciate that other embodiments can be achieved. For example, the ranges can be varied to accommodate different character sets previously used to each of the two bytes of the second year datum separately representing a single decimal digit of a second year;

(b) examining at least one of the plurality of year data to determine whether said at least one of the plurality of year data has a composite binary integer value which is inside or outside a range from 12,336 to 14,649, inclusive;

(c) if step (b) determines that said composite binary integer value of at least one of the plurality of year data is outside said range, defining the composite binary integer value as a number representing the first year; and (d) if step (b) determines that said composite binary integer value of said at least one of the plurality of year data is inside said range, determining the single decimal digit represented by said each of the two bytes of the second year datum and determining the second year represented by the second year datum in accordance with the single decimal digit represented by said each of the two bytes of the second year datum.

2. A series of operational steps to be performed on or with the aid of a computer, said steps comprising:

(a) providing a computer-readable storage medium storing a plurality of year data, the plurality of year data comprising (i) a first year datum comprising two bytes which together have a composite binary integer value which represents at least four decimal digits of a first year and (ii) a second year datum comprising two bytes, each of the two bytes of the second year datum separately representing a single decimal digit of a second year;

(b) examining at least one of the plurality of year data to determine whether said at least one of the plurality of year data has a composite binary integer value which is inside or outside a range from 61,680 to 63,993, inclusive;

(c) if step (b) determines that said composite binary integer value of at least one of the plurality of year data is outside said range, defining the composite binary integer value as a number representing the first year; and (d) if step (b) determines that said composite binary integer value of said at least one of the plurality of year data is inside said range, determining the single decimal digit represented by said each of the two bytes of the second year datum and determining the second year represented by the second year datum in accordance with the single decimal digit represented by said each of the two bytes of the second year datum.

3. A series of operational steps to be performed on or with the aid of a computer, said steps comprising:

(a) providing a computer-readable storage medium storing a plurality of year data, the plurality of year data comprising (i) a first year datum comprising two bytes which together have a composite binary integer value which represents at least four decimal digits of a first year and (ii) a second year datum comprising two bytes, each of the two bytes of the second year datum separately representing a single decimal digit of a second year;

(b) examining at least one of the plurality of year data to determine whether said at least one of the plurality of year data has a composite binary integer value which is (i) inside a first range from 12,336 to 14,649, inclusive, or a second range from 61,680 to 63,993, inclusive, or (ii) outside both said first range and said second range;

(c) if step (b) determines that said composite binary integer value of at least one of the plurality of year data is outside both said first range and said second range, defining the composite binary integer value as a number representing the first year; and (d) if step (b) determines that said composite binary integer value of said at least one of the plurality of year data is inside either said first range or said second range, determining the single decimal digit represented by said each of the two bytes of the second year datum and determining the second year represented by the second year datum in accordance with the single decimal digit represented by said each of the two bytes of the second year datum.

* * * * *